(12) United States Patent
Pollock et al.

(10) Patent No.: US 7,219,689 B2
(45) Date of Patent: May 22, 2007

(54) AUTOMATICALLY FLUSHING WATER REGULATOR FOR ANIMAL WATERING SYSTEMS

(75) Inventors: Eugene B. Pollock, Assumption, IL (US); James M Adermann, Altamont, IL (US)

(73) Assignee: The GSI Group, Inc., Assumption, IL (US)

( * ) Notice: Subject to any disclaimer, the term of this patent is extended or adjusted under 35 U.S.C. 154(b) by 302 days.

(21) Appl. No.: 10/984,460

(22) Filed: Nov. 9, 2004

(65) Prior Publication Data

US 2006/0096640 A1    May 11, 2006

(51) Int. Cl.
G05D 16/08 (2006.01)
F16K 31/06 (2006.01)

(52) U.S. Cl. ............... 137/505.46; 137/495; 137/508; 137/599.09; 137/601.14

(58) Field of Classification Search ........... 137/505.46, 137/599.09, 601.14, 495, 508
See application file for complete search history.

(56) References Cited

U.S. PATENT DOCUMENTS

| | | | | |
|---|---|---|---|---|
| 1,755,639 | A | * 4/1930 | Fawcett | ............... 137/599.09 |
| 3,207,175 | A | * 9/1965 | Pauly | ............... 137/505.46 |
| 3,476,146 | A | * 11/1969 | Dolter | ............... 137/601.13 |
| 4,067,355 | A | * 1/1978 | St. Clair | ............... 137/505.46 |
| 4,421,061 | A | 12/1983 | Shomer et al. | |
| 4,852,522 | A | 8/1989 | Uri | |
| 4,991,621 | A | 2/1991 | Steudler, Jr. | |
| 5,070,903 | A | 12/1991 | Steudler, Jr. | |
| 5,074,250 | A | 12/1991 | Clark, IV | |
| 5,174,331 | A | 12/1992 | Steudler, Jr. | |
| 5,429,072 | A | 7/1995 | Schumacher | |
| 5,522,346 | A | 6/1996 | Clark, IV | |
| 5,735,306 | A | 4/1998 | Olds et al. | |
| 5,765,588 | A | 6/1998 | Katz | |
| 5,771,921 | A | 6/1998 | Johnson | |
| 5,870,970 | A | 2/1999 | Katz | |
| 5,967,181 | A | 10/1999 | Momont et al. | |
| 6,098,959 | A | 8/2000 | Momont et al. | |
| 6,202,682 | B1 | 3/2001 | Johnson | |
| 6,431,205 | B1 | 8/2002 | Bartos | |
| 6,712,021 | B2 | 3/2004 | Pollock | |

* cited by examiner

*Primary Examiner*—Stephen M. Hepperle
(74) *Attorney, Agent, or Firm*—Polster, Lieder, Woodruff & Lucchesi, L.C.

(57) ABSTRACT

A water pressure regulator for a watering system of an animal house is provided with a water inlet member comprising a watering path and a flush path. The watering path is operably engaged by the regulating valve. The inlet member is manually movable relative to the housing, to position the watering path outlet relative to the regulating valve to prevent the regulating valve from engaging the inlet member, thereby placing the regulator in a flush mode. The flush path has a water exit into the regulator spaced from the watering path port, and hence is not engagable by the regulating valve. A flush valve is provided in the flush path, and is moveable between a closed position in which the regulator will operate in a drinking mode and an open position in which the regulator will be in a flush mode. An actuator is provided which is operated by a control system to allow for automatic flushing of the watering line according to a predetermined schedule. Hence, the regulator can be switched between an operating mode and a flushing mode either manually or automatically. The control system can also control the lighting system and water supplement system for the animal house; and the control of the watering system can be tied to the lighting and medicating systems.

17 Claims, 8 Drawing Sheets

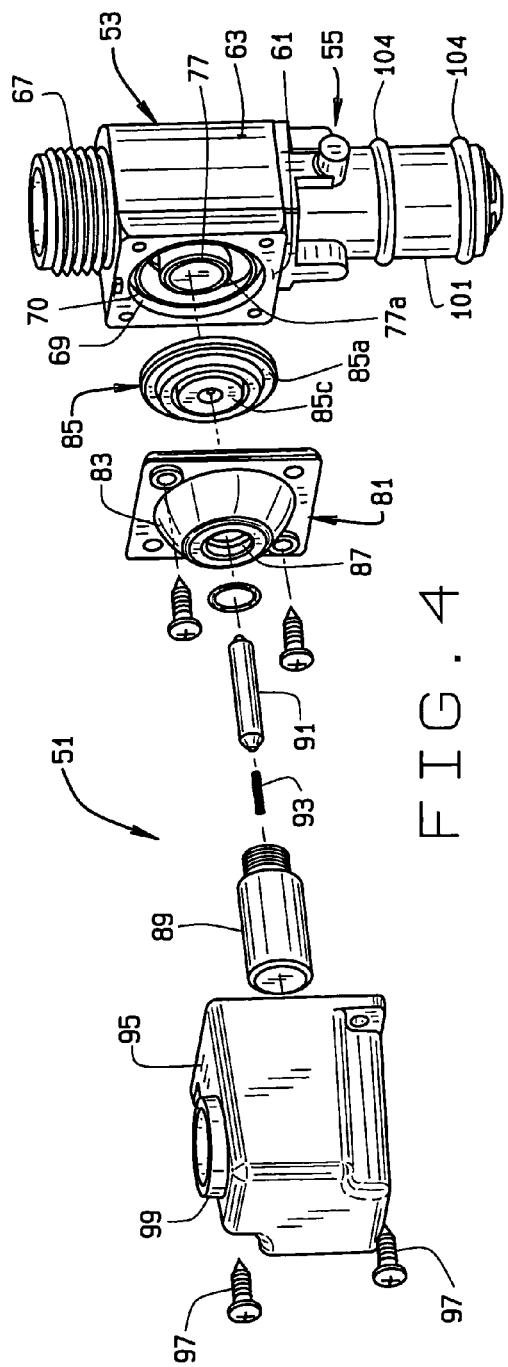
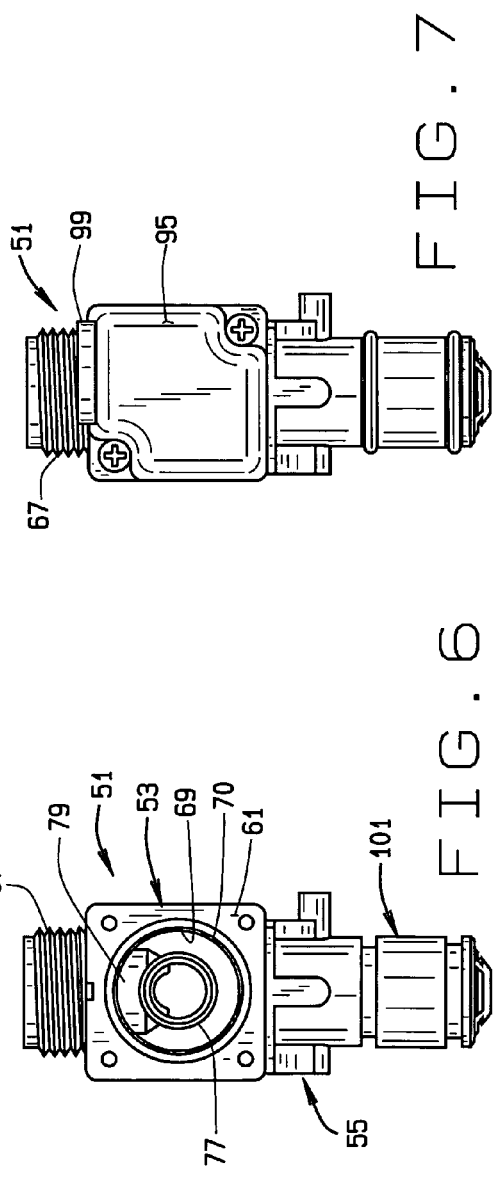
FIG. 4
FIG. 6
FIG. 7

AUTOMATICALLY FLUSHING WATER REGULATOR FOR ANIMAL WATERING SYSTEMS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to a water pressure regulator, and in particular, to a water regulator for use in a drinking system in a poultry house which allows for the water regulator, and the drinking system of the poultry house, to automatically be switched between a low pressure operational mode and a higher pressure flushing mode.

Drinking or watering systems for poultry houses are supplied with water at relatively high line pressure (e.g., 20–60 psi). The water is delivered at lower pressure to a watering line extending the length of a poultry house or the like. The watering line has a series of spaced apart watering stations or drinkers therealong at which birds can get water by pecking at a movable pin or lever. One such watering station is shown for example in U.S. Pat. Nos. 5,522,346 and 5,074,250, both to Clark. For the drinkers to operate properly, the water pressure in the watering line must be reduced to only a few inches of water (i.e., less than 6"–12" of H2O). Typically, in order to reduce the water pressure, the water passes though a regulator before entering the water line which leads to the drinking stations.

The water in the drinking system may be hard well water. That is, it may contain minerals and solid particles which settle or precipitate out in the pipes and the regulator. Additionally, the chickens are provided with medication and nutritional supplements (such as vitamins) through the water. These supplements can also settle out or be deposited in the drinking system. Thus, it is advantageous that the drinking system be flushed out periodically to prevent the various minerals and particles from accumulating in the regulator and drinking stations, and thus possibly interfering with the operation of the regulator and the drinking stations.

U.S. Pat. No. 6,712,021, which is incorporated herein by reference, discloses a pressure regulator which overcame many of the problems associated with the some of the more common types of water pressure regulators. This regulator is manually switched between an operating mode and a flush mode. Hence, if a poultry house had several watering lines, each with their own regulator, each pressure regulator for each watering line would have to be independently and manually operated to fully flush the watering system. It would be desirable to have a pressure regulator which could be automatically flushed and which would not have to be manually operated.

Additionally, it would be desirable to flush the watering system at predetermined times. For example, to avoid the drinkers from being operated by the chickens during a flush mode, it is preferable to flush the watering system at night (or when the chicken house is dark), when the chickens are less active. Further, as noted above, medicaments (including vitamins, nutritional supplements, and medicines) are often delivered to the chickens through the watering system. To avoid any undesired interaction between a currently delivered medicament and any previously delivered medicament, it is desirable to flush the watering system prior to the introduction of the medicament into the watering system. Additionally, to help prevent over medication of the chickens, it is desirable to flush the system after a predetermined amount of time after introduction of the medicament to remove excess medicament from the watering pipes. Further, disinfectants can be passed through the watering system to remove germs, bacteria, or other unwanted organisms that may grow in the watering line. Depending on the disinfectant used, it can be desirable to flush the watering system after the disinfectant has been introduced into the watering system. Some medications cannot be mixed with disinfectants. Hence, flushing after disinfecting the watering system will also reduce the possibility of medications from being adversely affected by the disinfectant. Lastly, the temperature in a chicken house can get quite warm, and, as the chicken house warms up, the water in the watering line also warms up. When the chicken house warms up, it would be desirable to promote the drinking of water by the chickens. To do this, the watering system can be flushed to introduce cooler water into the watering system.

BRIEF SUMMARY OF THE INVENTION

Briefly stated, a pressure regulator for an animal drinking system is provided which can be manually or automatically switched between an operating, drinking or watering mode and a flushing mode. The regulator comprises a housing defining a chamber. A flexible diaphragm is carried by the housing and is sealed with respect to said housing. The diaphragm divides the chamber into a water chamber and an ambient chamber. The water line of the watering system is in fluid communication with said water chamber. A spring is carried by the housing in operable engagement with the diaphragm such that the force of the spring and of the atmosphere acts upon the diaphragm to force the diaphragm toward the water chamber.

A water inlet member adapted to be connected to a supply line is carried by the housing to place the housing water chamber in communication with the water supply line. The inlet member defines both a watering flow path and a flush flow path, both of which communicate with the housing water chamber and the water supply line. Both the watering flow path and the flush flow path have a ports through which water passes to enter the housing water chamber. The flush path exit port is spaced axially from the watering path exit port.

A regulator valve carried by the housing is operatively associated with the diaphragm for movement between a closed position in which the valve blocks the flow of water from the inlet member watering port into the water chamber and an open position in which water is permitted to flow from the inlet member watering port into the water chamber such that with the spring adjusted to a predetermined level, the force of the spring acting on the lower side of the diaphragm balances the force exerted on the water side of the diaphragm thereby to regulate the pressure of the water in the water chamber and within the watering pipe to a predetermined water pressure substantially less than the pressure of the water supply. The inlet member is manually movable axially with respect to the housing between a regulating position in which the watering path port is engageable by the valve member so as to block the flow of water from the watering path port into the water chamber and a flushing position in which the watering path port is clear of the valve so as to permit water from the supply line to flow through the water chamber and into the watering pipe to flush the water chamber and the watering pipe. Means, such as a lever associated with the inlet member, is provided to move the inlet member between its regulating and flushing position. The means for manually switching the regulator between its watering and flushing modes comprises the inlet member moving means.

The inlet member comprises a inlet adapted to be connected to a source of water, a flush inlet port extending between the watering flow path and the flush flow path, and a flush valve in the flush flow path. The flush valve is movable between a closed position in which water cannot flow through the flush flow path and a open position in which water can flow through the flush flow path into the water chamber to flush the water chamber and the watering pipe. In the open position, water flows through the flush flow path to place the regulator in a flush mode, independently of the position of the inlet member. When the flush valve is in the closed position, water cannot flow through the flush flow path, and the position of the inlet member controls whether the regulator will be in a watering mode or a flush mode. The flush valve includes a valve member (such as a diaphragm) operable to be engaged with and disengaged from an end of the flush inlet port to move the flush valve between its the open and closed positions. Hence, the means for automatically switching the regulator between its watering and flush modes comprises the flush valve.

The inlet member can be provided with an actuator (such as a solenoid) to allow for remote control of the flush by the control system. The animal house in which the watering system is located can be provided with either a remote switch to allow for selective activation of the flush valve actuator to place the watering system in a flush mode at a desired time. Alternatively, or in addition, the animal house can include a controller which activates the flush valve actuator at predetermined times or intervals or upon the temperature of either the animal house or the water in the watering line reaching a predetermined temperature. Temperature control of the flush valve would be combined with a timing control, to prevent flushing of the watering line before a predetermined time has elapsed from the last time the watering line was flushed.

The animal house can also have a lighting system which is operatively connected to the control system to be controlled by the control system. Hence, the animal house lights will be turned on and off according to a predetermined schedule programmed into the controller. The controller can be programmed such that the flush valve is activated a predetermined time after the lights are turned off, to prevent flushing of the system when the animals are active and using the watering system.

The animal house can additionally include a supplement system which is connected to the watering system to introduce supplements, such as vitamins, minerals and/or medicaments into the watering system. Such supplements would be water dissolvable or water dispersible. The supplement system comprises at least one supplement hopper in communication with the watering system and containing a supplement dispersible or dissolvable in water, a supplement valve positioned between the supplement hopper and the watering line, and a supplement actuator. The supplement valve is moveable between a closed position in which supplement cannot flow into the watering system and an open position in which supplement can flow into the watering system, and the supplement actuator is operable to move the supplement valve between its open and closed position.

The supplement actuator can be manually operated or operably connected to the controller such that the controller activates and deactivates the supplement actuator according to a predetermined schedule. The watering system can be controlled by the controller in conjunction with the supplement system as well. The controller can activate the flush valve to flush the watering system a predetermined time before and/or a predetermined time after activation of the supplement system.

As can be appreciated, the watering system can comprise several watering lines, each of which has a regulator with a flush valve and a flush actuator. The control system can be operable to activate the any desired combination of the flush actuators. Thus, specific watering lines can be flushed individually, a desired set of watering lines can be flushed together while some watering lines are not flushed, or all the watering lines can be flushed at once. Similarly, activating switches or override buttons can be provided for each regulator, or a single switch or button can be set to activate a desired set of the flush actuators.

BRIEF DESCRIPTION OF THE SEVERAL VIEWS OF THE DRAWINGS

FIG. 4 is an exploded perspective view of an inlet member for the regulator;

FIG. 6 is a side elevational view of the regulator inlet member;

FIG. 7 is a side elevational view of the regulator inlet member rotated 90° relative tot eh position of FIG. 6;

Corresponding reference numerals will be used throughout the several figures of the drawings.

DETAILED DESCRIPTION OF THE INVENTION

Figure 1:
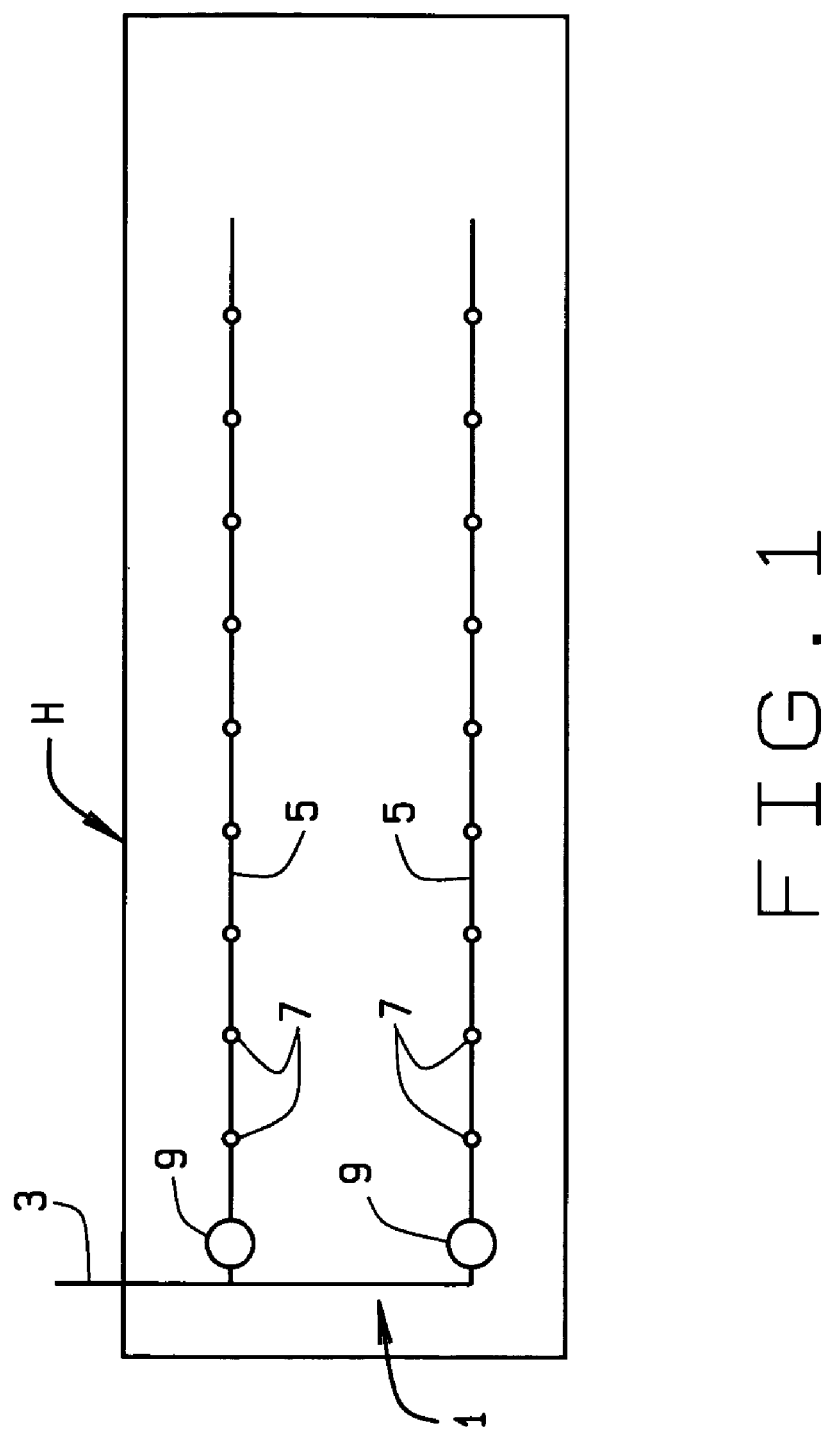
FIG. 1 is a schematic drawing of a poultry house watering system.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A watering system 1 for use in a poultry house H is shown schematically in FIG. 1. The watering system 1 includes a water supply pipe 3 which is connected to watering pipes 5, two of which are shown. A plurality of watering stations or drinkers 7 is spaced along each watering pipe 5. As is known, watering stations in poultry houses include valves, such as disclosed in U.S. Pat. Nos. 5,522,346 and 5,074,250 (which are incorporated herein by reference) which are activated by birds pecking against a pin. The pressure within the water pipes 5 is critical, and must be maintained at a low pressure (i.e., less than 1"–24" of water) which is substantially less than the line pressure (e.g., 20–60 psi). Thus, water regulators 9 are positioned in the water pipes 5 before the watering stations 7. The regulators 9 can be placed at the beginning of the water pipes 5, as schematically shown in FIG. 1, or intermediate the water pipes 5.

Figure 2:
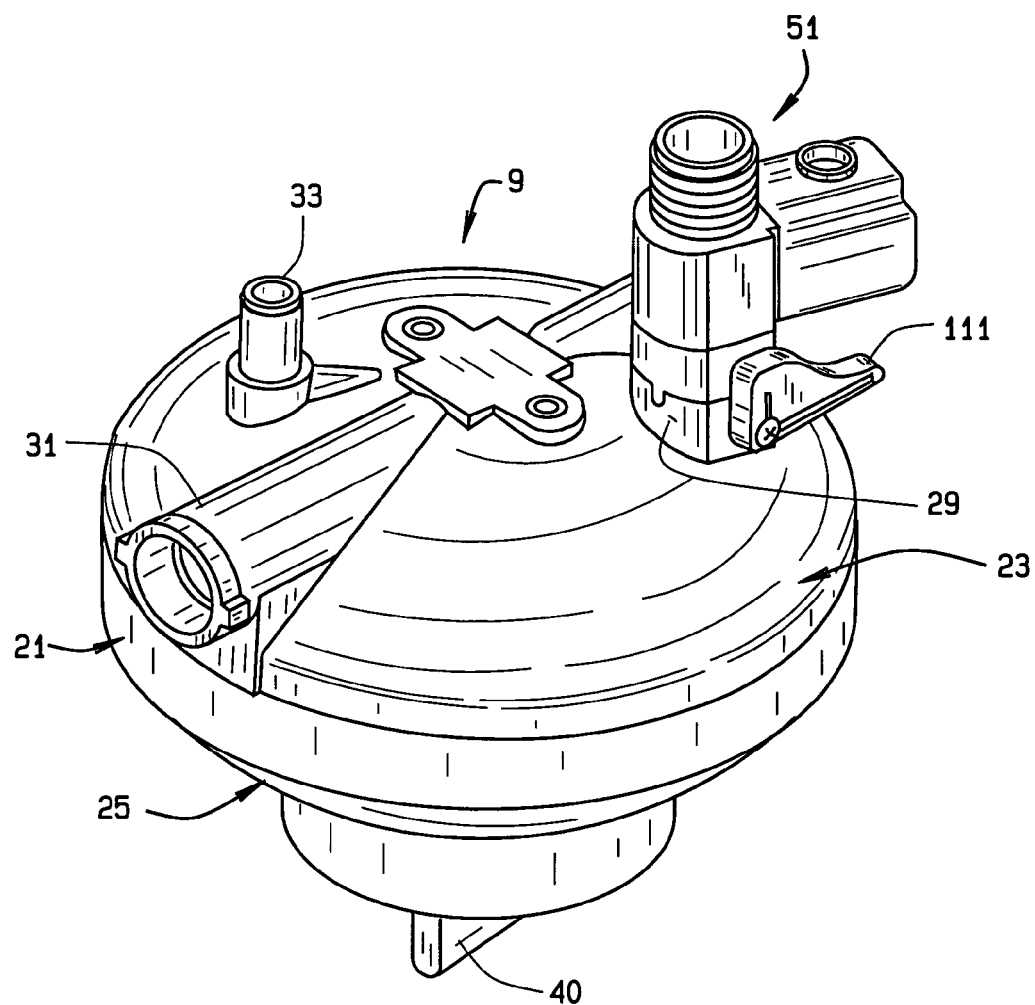
FIG. 2 is an perspective view of a watering system having an inlet member of the present invention.
Figure 3:
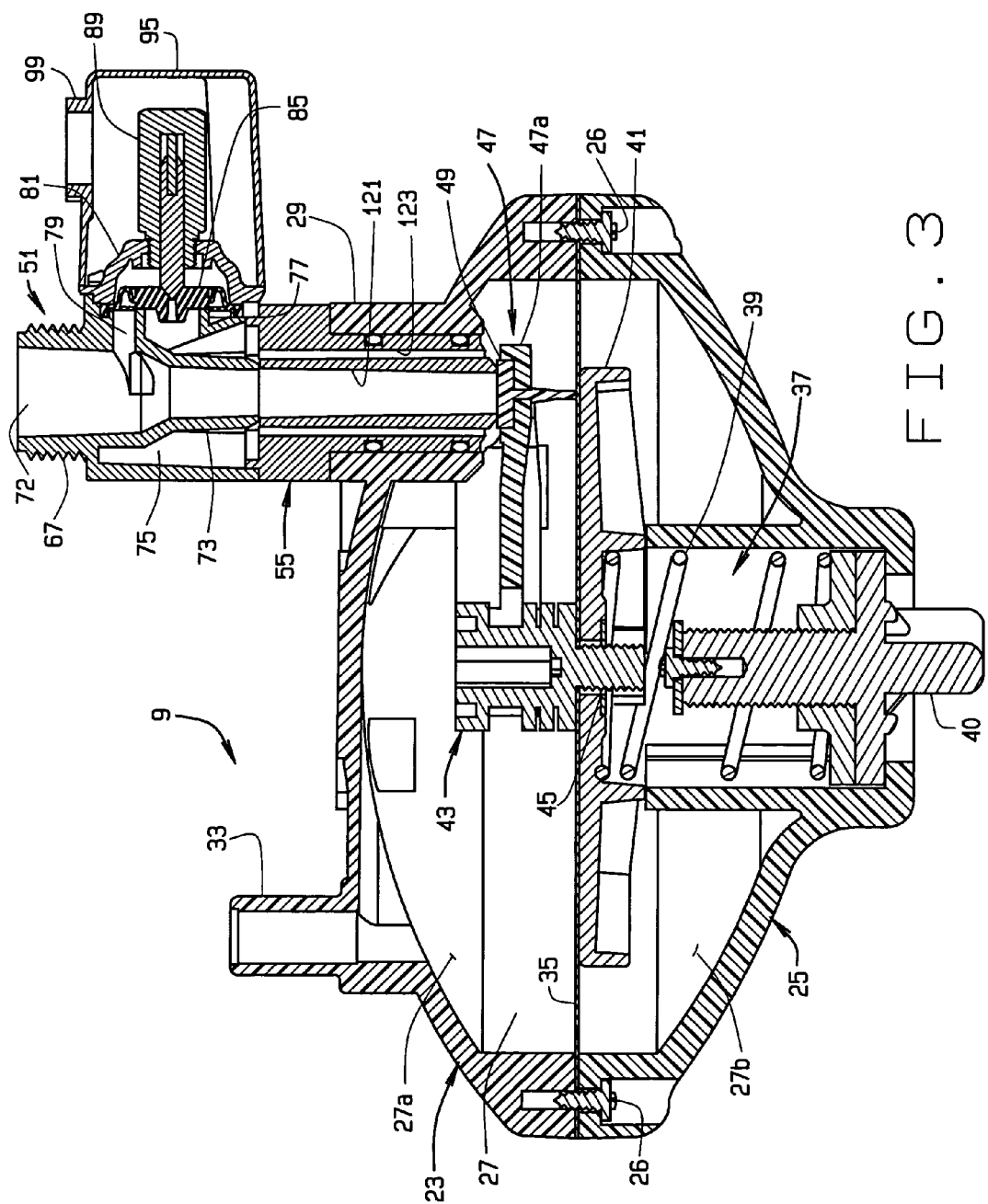
FIG. 3 is a cross-sectional view of the pressure regulator of the present invention.

The regulator 9 is shown generally in FIGS. 2–3. The regulator 9 includes a housing 21 having a top cover 23 and a bottom 25 which are sealably connected together by a plurality of fasteners 26 to define a chamber 27. An inlet sleeve 29 extends upwardly from the housing top cover 23 and an outlet 31 extends generally radially from a top cover 23. The outlet 31 is adapted to be connected to the water pipe 5 in any conventional manner. A hollow sleeve 33 extends upwardly from the top cover 23 to receive a standpipe.

A flexible diaphragm 35 extends across the chamber 27 and divides the chamber into a water chamber 27a and an ambient chamber 27b. An adjuster assembly 37 is received in the ambient chamber 27b. The adjustor assembly includes a spring 39 which urges the diaphragm 35 upwardly into the water chamber 27a. The spring pressure can be adjusted using a knob 40. A diaphragm support plate 41 is positioned between the underside of the diaphragm and the spring, such that the spring urges against the plate 41. A post 43 extends up from the diaphragm into the water chamber 27a. The post 43 is mounted to the plate 41 by means of a stem 45 which passes through the diaphragm 35 and into the plate 41. A pivot arm 47 extends from the post 43 and has a pad 49 in an upper surface at its free end 47a. The pivot arm 47 is pivotally connected to the housing top cover intermediate the post 43 and the free end, as described in U.S. Pat. No. 6,712,021, which is incorporated herein by reference. As explained therein, as the pressure within the water chamber 27a varies, the diaphragm 35 will move up and down. Movement of the diaphragm translates to movement of the post 43, which in turn causes the pivot arm 47 to pivot about its mounts thereby causing the arm free end 47a to move upwardly or downwardly based upon the motion of the diaphragm.

As just mentioned, the regulator housing is substantially identical to the to the regulator housing described in U.S. Pat. No. 6,712,021. The regulator 9, however, includes a different inlet member 51 which is different from the inlet tube of the regulator in the just noted patent. The inlet member 51 is shown in detail in FIGS. 4–17. The inlet member, as described in detail below, is sized, shaped and adapted to be received in the inlet sleeve 29. The inlet member is comprised of an upper section 53 and a lower section 55. Although the upper and lower sections are formed as individual parts which are then assembled together, they could be formed as a unitary one-piece part.

The inlet member upper section 53 (shown in FIGS. 4, 5 and 8–11) includes a top surface 57, bottom surface 59, generally flat front and side walls 61 and 63, respectively and a curved side wall 65. A neck 67 extends upwardly from the top surface 57 and is adapted to be connected to the water supply line. The neck 67 is shown to be threaded, for a threaded connection to the supply line. However, other conventional means could also be used to connect the neck 67 to the supply line. An opening 69 is formed in the front wall and an opening 71 is formed in the bottom wall 59. A circumferential groove or channel 70 surrounds the front wall opening 69.

Figure 5:
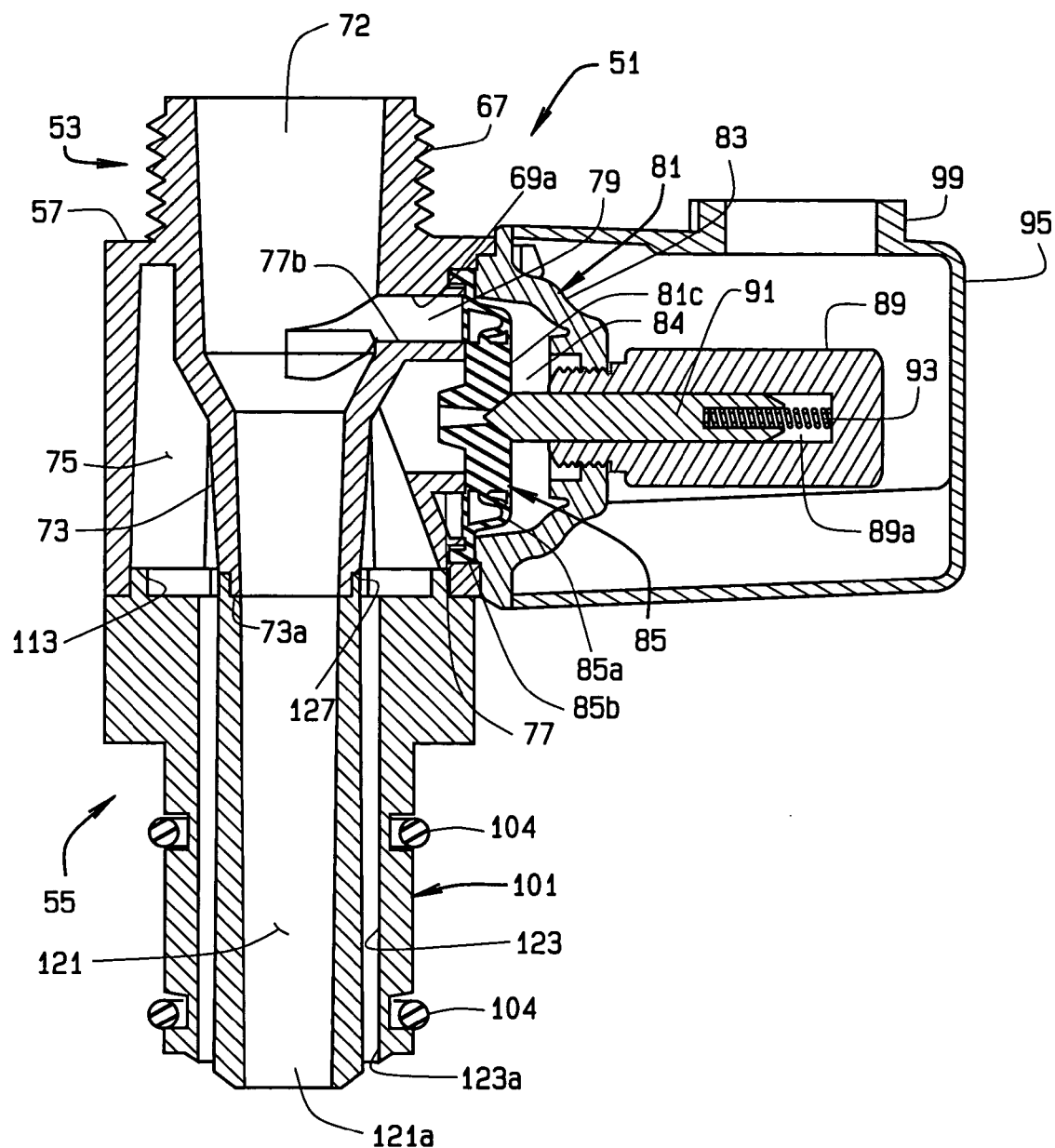
FIG. 5 is a cross-sectional view of the regulator inlet member.
Figure 8:
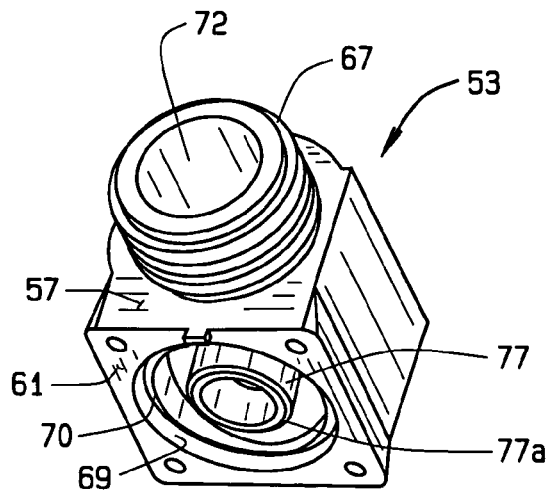
FIG. 8 is a perspective view of a top portion of the regulator inlet member.
Figure 9:
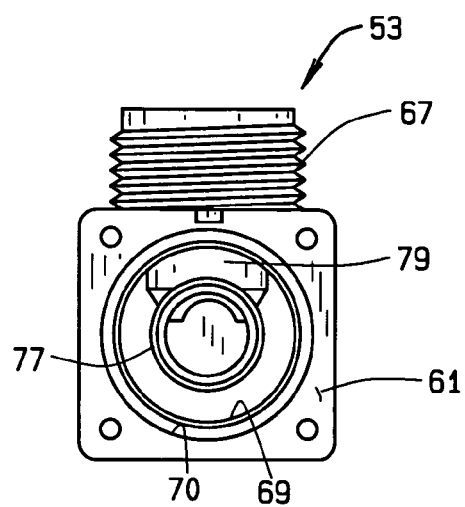
FIG. 9 is a side elevational view of the regulator inlet member top portion.
Figure 10:
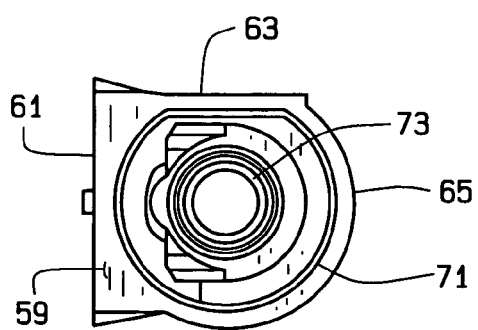
FIG. 10 is a bottom plan view of the regulator inlet member top portion.
Figure 11:
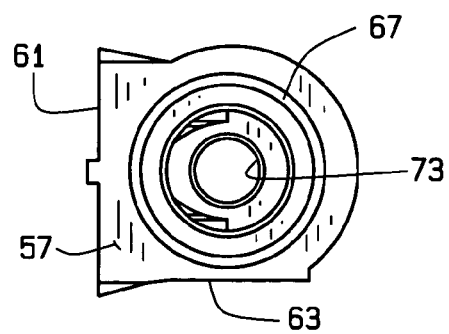
FIG. 11 is a top plan view of the regulator inlet member top portion.
Figure 12:
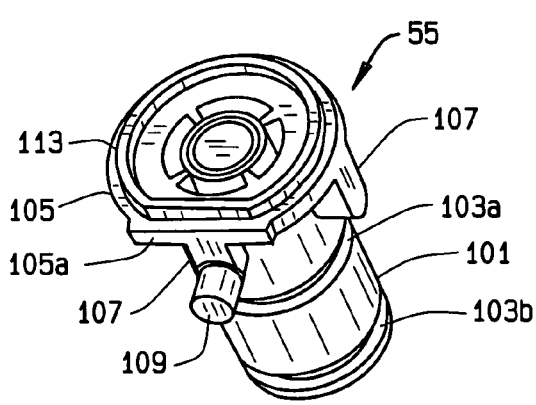
FIG. 12 is a top perspective view of a bottom portion of the regulator inlet member.
Figure 13:
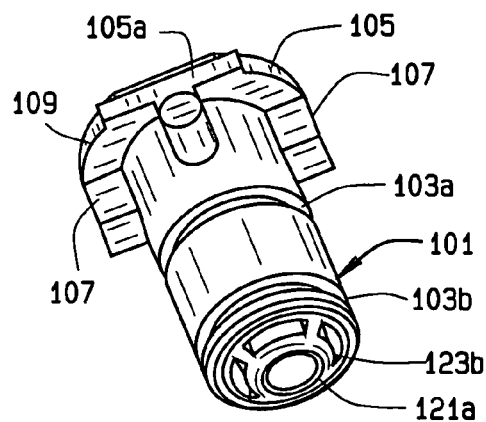
FIG. 13 is a bottom perspective view of the regulator inlet member bottom portion.
Figure 14:
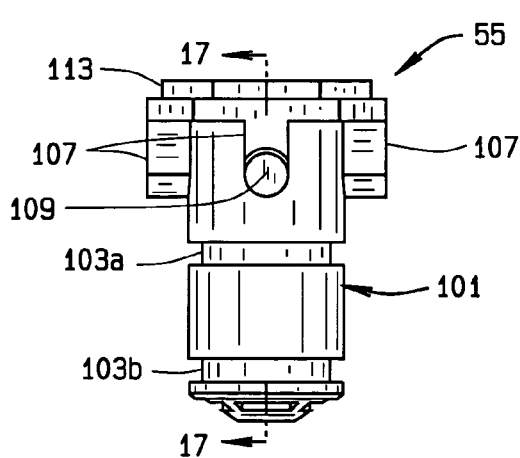
FIG. 14 is a side elevational view of the regulator inlet member bottom portion.
Figure 15:
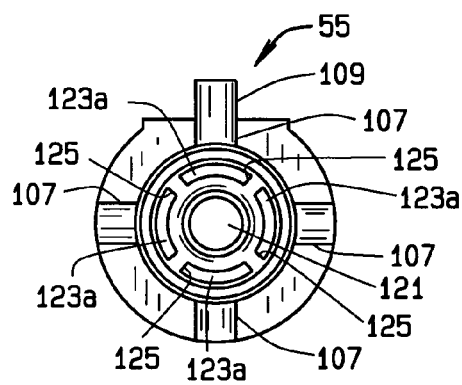
FIG. 15 is a bottom plan view of the regulator inlet member bottom portion.
Figure 16:
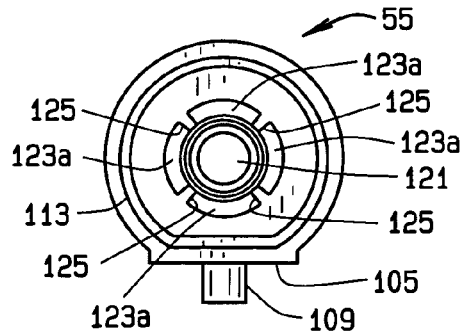
FIG. 16 is a top plan view of the regulator inlet member bottom portion.
Figure 17:
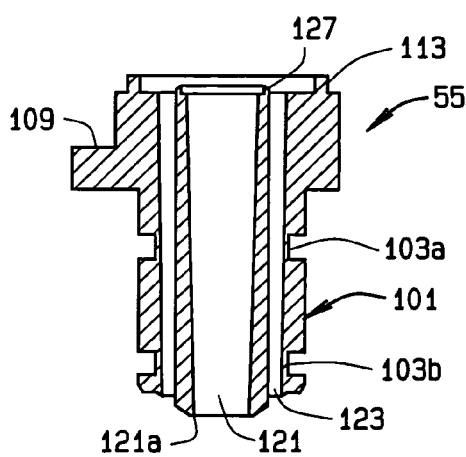
FIG. 17 is a cross-sectional view of the regulator inlet member bottom portion taken along line 17—17 of FIG. 14.

Internally, the inlet member upper section 51 includes an inlet 72 in the neck 67. An inner tube 73 is positioned below the inlet 72 and is in communication with the inlet. The inner tube 73 defines an upper portion of a watering flow path. The tube 73 has a bottom edge 73a which is flush with the bottom surface 59 of the inlet member upper section 51, and, as seen in FIG. 5 is stepped to form an outwardly facing shoulder. The inner tube 73 is spaced from the inner surfaces of the walls 61, 63 and 65 to define a chamber 75 which surrounds the tube 73. The chamber 75 defines an upper part of a flush flow path. A short tube 77 extends from the side opening 69 into the chamber 75, and hence defines an inlet into the flush flow path. The tube 77 has an end edge 77a which is generally flush with, or spaced inwardly slightly from, the outer surface of the side wall 61. The tube 77 has a diameter smaller than the diameter of the opening 69. As seen in FIG. 5, an upper surface 77b of the tube 77 extends from the inner tube 72 and is spaced from the surface 69a defining the opening 69. This space between the tube surface 77b and the opening surface 69a defines a port 79 which is in communication with the inlet 72.

Turning to FIGS. 4 and 5, a retainer 81 having a domed section or cup 83 is received over the front wall opening 69. The retainer cup 83 defines a chamber 84 which is in communication with both the port 79 and the tube 77. Hence, the inlet member chamber 75 is placed in fluid communication with the inlet 72 by means of the retainer chamber 84. The diaphragm 85 is positioned in the retainer chamber. The diaphragm 85 has a web 85a with a seal 85b formed at the edge of the web. The seal 85b is sized and shaped to be received in the channel 70 surrounding the side opening 69. The central portion 85c of the diaphragm 85 is sized and shaped to seal against the outer edge 77a of the side tube 77. Hence, the tube edge 77a defines a seat against which the diaphragm 85 seals. The diaphragm 85 is secured in place over the side opening 69 by the retainer 83. The diaphragm is movable by a solenoid 89 between a first position in which the diaphragm is seated against the tube edge 77a to close the inlet into the chamber 75 (and hence prevent the flow of water from the inlet 72 into the chamber 75) and a second position in which the diaphragm is unseated from the tube edge 77a, such that water can flow from the inlet 72 into the chamber 75.

The retainer 81 domed central section 83 has an opening 87 adapted (as with threads) to receive the tubular solenoid 89. The solenoid 89 defines a chamber 89a which is open at the end facing the diaphragm 85. A solenoid piston 91 and spring 93 are received within the solenoid chamber 89a. The piston 91 extends out from the end of the tubular solenoid 89 to engage the diaphragm 85 at the central portion 85a thereof. The retainer 81 and solenoid 89 are enclosed by a solenoid cover 95 which is secured to the inlet member upper portion side wall 61 in any conventional manner, such as by screws 97. The cover 95 includes a neck 99 to allow for the connection of wire leads between the solenoid 89 and a power source.

The solenoid spring 93 urges the piston 91 to an extended position, shown in FIG. 5. In this position, the diaphragm is engaged with and seals against the end edge 77a of the tube 77, and the upper member chamber 75 is closed with respect to the inlet member neck 67, and water is prevented from flowing through the port 70 and into the flush chamber 75. When the solenoid 89 is activated, the piston 91 is retracted against the force of the spring 93 to pull the diaphragm away from the tube 77, thereby opening the tube and placing the tube 77 and the chamber 75 in communication with the inlet 72. In this open position, the flush chamber inlet tube 77 is opened, and water can flow through the port 70, through the tube 77 and into the flush chamber 75. As can be appreciated, the diaphragm is moveable by action of the solenoid between its noted closed and open positions. As will be described in more detail below, the solenoid can be remotely controlled by a programmable control system, or by the use of a switch.

The inlet member bottom section 55 (FIGS. 12–17) comprises a body 101 corresponding to the shape of the internal surface of the regulator housing inlet sleeve 29. In the embodiment shown, the inlet sleeve 29 and the bottom section body 101 are both shown to be cylindrical. The body could be formed in other shapes as well, if desired. A pair of circumferential grooves 103a,b are formed in the body outer surface to receive O-rings 104 (FIGS. 4–5) to provide for a fluid tight seal between the body 101 and the inlet sleeve 29. A flange 105 extends outwardly from the top of the body 101. As seen, the flange 105 is generally circular, but has a flattened edge 105a. Alignment ears 107 extend downwardly from the bottom of the flange 105 and outwardly from the body 101. The ears 107 are received in corresponding slots in the regulator housing inlet sleeve 29 as described in the above-noted U.S. Pat. No. 6,712,021 which is incorporated herein by reference. As noted therein, the engagement of the inlet sleeve slots with the inlet member ears allow for the inlet member to move axially, but not rotationally, with respect to the inlet sleeve 29. A finger 109 extends outwardly from the ear 107 below the flange flat surface 105a. The finger 109 receives a lever 111 (FIG. 2) to allow for manual movement of the inlet member 51. As described in the just noted patent, axial movement of the inlet member switches the regulator 9 between a flushing mode and a watering mode.

A rib 113 extends upwardly from the top surface of the flange 105 and is spaced slightly inwardly from the periphery of the flange. The rib 113 is sized and shaped to be received in the bottom opening 71 of the inlet member upper portion as seen in FIG. 5. Hence, the rib 113 and the upper portion bottom opening 71 are complementarily shaped. As shown, the bottom portion rib 113 and the upper portion bottom opening 71 are both in the shape of circles having a flattened edge. The fit between the rib 113 and the inner surface of the bottom opening 71 preferably defines a fluid tight seal. If desired, an O-ring could be provided to facilitate the forming of a seal between the rib 113 and the opening 71.

Internally, the inlet member bottom portion 55 includes a central passage 121 which defines a lower portion of the watering flow path and an outer passage 123 which defines a lower portion of the flush flow path. Both passages extend generally axially from the top of the inlet member portion 55 to its bottom. The flush passage 123 can, as shown, include four discrete channels 123a which are separated by ribs 125 which extend the length of the body 101. A small lip 127 surrounds the opening to the watering passage 121 on the top surface of the body 101. As seen in FIG. 5, the lip 127 is sized and shaped to mate with the bottom edge 73a of the tube 73 in the inlet member upper portion 53. As such, the lip 127 includes an inwardly facing shoulder which mates with the outwardly facing shoulder at the bottom edge 73a of the upper portion inner tube 73. At the bottom end of the body, it will be seen that the outlet 121a of the watering passage 121 is spaced axially below from the outlet 123b of the flush passage.

Turning to FIG. 5, when the inlet top and bottom members 52 and 55 are assembled together, the inlet member bottom water passage 121 is aligned with, and forms a continuation of, the inner tube 73 from the inlet upper member 53; and the inlet bottom member flush passage 123 is in communication with the upper member chamber 75.

As seen in FIG. 3, when the inlet member 51 is inserted in the inlet sleeve 29 of the regulator housing 21, the outlet 121a of the watering passage will be closed and opened by the action of the pivot arm 47. That is, based upon the pressure in the water chamber 27a, the diaphragm 35 will move up and down, causing the pivot arm 47 to pivot between a closed position in which the pad 49 at the free end of the arm contact and seals against the watering passage port 121a and an open position in which the pivot arm pad 49 will be spaced from the water passage outlet 121a. Hence, the pivot arm defines a regulator valve of the pressure regulator. When the pivot arm 27 is in the open position, water can pass from the water supply, through the inlet member inlet 72, the upper member tube 73 and the water passage 121 to enter the regulator water chamber 27a. When the pivot arm is in its closed position, the passage of water into the chamber 27a through the watering passage 121 is blocked.

As seen, when the pivot arm 45 is in the closed position, the flush passage outlet 123a is spaced above the pad 49, and hence, the pivot arm pad 49 cannot close the flush passage 123. However, when the diaphragm 85 is sealed against the inlet member tube 77, the flow of water into the chamber 75, and hence into the flush passage 123 is blocked. Thus, the only path flow is through the watering passage 121, and the regulator will operate to regulate the water pressure within the watering system for proper operation of the drinkers 7. When the solenoid 89 is activated, the inlet member diaphragm 85 is pulled back, or unseated, from the inlet member tube 77 to place the inlet member tube (and hence the upper portion chamber 75 and the flush passage 123) in communication with the inlet member inlet 72 (and hence the water supply) by way of the port 79. Thus, water will flow through the inlet 72, port 79, tube 77 and into the inlet member chamber 75 and flush passage 123. Inasmuch as the flush passage outlet 123a is spaced from the pad 49, water will enter the water chamber at full line pressure to allow for flushing of the watering system. The regulator will then be in a flush mode until the solenoid 89 is deactivated and inlet member diaphragm is closed. Hence, the diaphragm defines a flush valve for the regulator.

As seen, the diaphragm only opens and closes the chamber inlet tube 77. Thus, when the diaphragm is moved to the open position, to open the flush flow path to the flow of water from the inlet 72, the water flow path remains open, and hence, water flows through both the water flow path and the flush flow path. If the inlet member is in its lowered position, the pivot arm (or regulator valve) 49 may be in the closed position. When the diaphragm is opened, water (at full line pressure) will fill the regulator water chamber 27a. As the water chamber is filled, the water pressure within the chamber will force the diaphragm down, thereby causing the pivot arm to pivot up into engagement with the water path port 121a, to close the water flow path at the port 121a. Thus, although the diaphragm does not close the water flow path, the pivot arm does, and during a flush operation initiated through the flush valve, water will ultimately only flow through the flush flow path (defined by the upper member chamber 75 and the lower member passage 121).

Thus, as can be appreciated, the regulator 9 can be placed in a flush mode in two ways. First, the inlet member can be manually raised and lowered using the lever 111. As discussed in U.S. Pat. No. 6,712,021, when the inlet member 51 is raised, the pivot arm cannot close the water passage outlet 121a. Secondly, the regulator can be placed in a flush mode by unseating the diaphragm 85 from the chamber inlet tube 77 by activation of the solenoid, as explained above.

Figure 18:
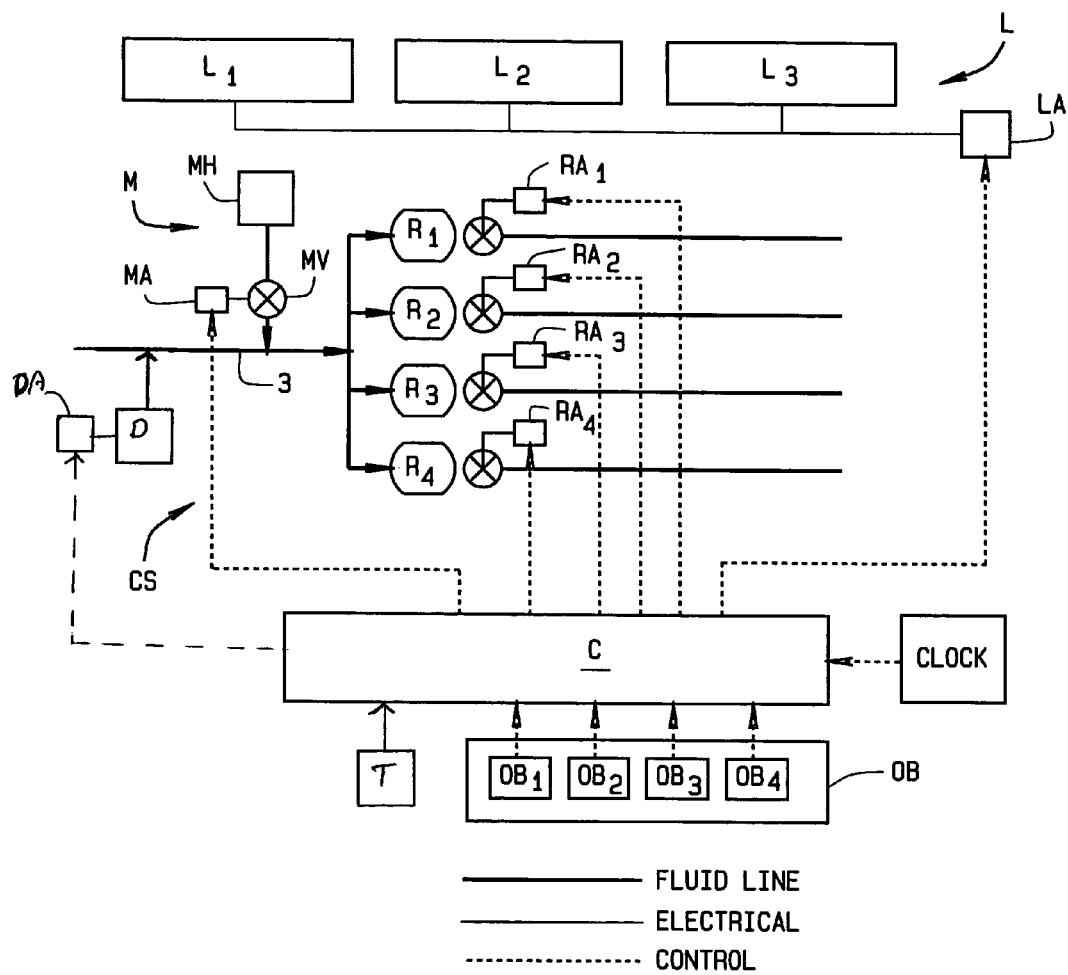
FIG. 18 is a schematic diagram of a control system for the regulator.

Turning to FIG. 18, the provision of the solenoid 89 to operate the diaphragm 85 allows for the regulator to be controlled by a control system CS to allow for automatic flushing of the watering system at predetermined times. A poultry house includes a lighting system L and a medicating system M both of which can be controlled by a controller C. The lighting system L includes a plurality of lights $L_1$, $L_2$, $L_3 \ldots L_n$ which are turned on and off by the activation and deactivation of one or more light actuators LA. The medicating system M includes a hopper MH which delivers water dissolvable or water dispersible supplements (such as medicaments, vitamins, minerals, nutrients, nutritional supplements, etc) into the water supply line 3. A valve MV can be opened and closed by the activation and deactivation of an actuator MA to allow the supplements from the hopper to flow into the water supply line. The controller C can be, for example, a CPU which can be programmed to turn the lights on and off at certain predetermined times and to dispense medication or feed supplements at predetermined times. As seen in FIG. 18, the watering system is shown to include several regulators 9 which are denoted as $R_1$, $R_2$, $R_3$ and $R_4$, and each regulator is provided with an actuator $RA_1$–$RA_4$. The actuators $RA_1$–$RA_4$ correspond to the solenoid 89 and its spring biased piston 91.

It is desirable to flush the watering system when the animals are not drinking and will not be using the watering system. This generally occurs when the animals are sleeping—i.e., when the lights in the animal house are turned off. Hence, the controller can be programmed to activate the solenoid to flush the watering system a predetermined amount of time after the lights in the animal house have been turned off. This will help ensure that the drinkers will not be used during a flushing procedure.

It is also desirable to flush the watering system before and/or after the administration of medicine or feed supplements to the animals through the water supply. It is desirable to flush the watering system prior to administration of medicine or other supplements to be sure that there is no residual medication or supplement from a prior dosing. This will avoid the potential of two medications or supplements from interacting with each other. It is also desirable to flush the system after dosing is finished to reduce the possibility of the animals receiving more medication or supplements than necessary. Hence, the controller can be programmed to flush the watering system prior to activation of the medication system M, and then to again flush the watering system a predetermined time after the medication system has been activated or when the controller otherwise determines that the medication cycle is complete.

Often disinfectants will be passed through the watering system to remove any bacteria, germs, etc. which may be in the watering system. Depending on the disinfecting agent used, the disinfecting agent may adversely effect the medicament being introduced into the watering system. In such situations, it is desirable to flush the watering system after the system has been disinfected. To this end, the watering system is provided with a source of disinfectant D. The disinfectant source is opened and closed by a disinfectant actuator DA, which is controlled by the controller C to admit, or prevent the admission of, disinfectant into the watering system. The controller can be programmed such that the system is flushed a predetermined amount of time after the disinfectant has been introduced into the watering system. Alternatively, the control system can be controlled such that system is flushed as the disinfectant is released into the watering system, to increase the speed at which disinfectant reaches the ends of the watering system watering lines.

It is desirable to promote drinking when the temperature in the animal house reaches a predetermined level. Drinking will help reduce dehydration of the animals and can also help cool the animals. One way to promote drinking is to provide the chickens with cooler water. Additionally, chickens can use the watering system to wet their combs and wattles, and allow evaporation to aid in cooling the birds. As can be appreciated, the water in the watering line will reach the ambient room temperature. Hence, to promote drinking and to facilitate cooling, the chickens need to be provided with cooler water. To facilitate this, the control system CS includes a temperature probe T, which can be situated either in the chicken house itself or in the watering line. If the probe is in the watering line, then it is preferably positioned near the end of the watering line. The temperature probe T will send a signal to the controller C indicative of the temperature of either the chicken house or of the water temperature. Upon reaching a predetermined temperature (for example, of about 100° F.), the controller C will activate the flush valves to flush the watering system. This will force the warm water out of the watering system, and replace the water with fresh, cooler water. The flushing of the watering system based on temperature is also dependant upon when the system was last flushed. Thus, if the watering system were recently flushed (e.g., within the past hour), then the temperature controlled flushing of the watering system will be overridden, to prevent the system from being flushed, for example, more than once each hour. In addition, if a normally scheduled flushing is to occur within a predetermined period of time (e.g., within fifteen minutes), for example in conjunction with the medicating system, the lighting system, or the timing system, then the temperature controlled flushing will be overridden in favor of the regularly scheduled flushing.

The regulator can be provided with an override button OB to allow for an operator to flush the watering system if, for some reason, the system requires flushing at an unscheduled, and unprogrammed time. The override button OB is an electrical switch, and can comprise any desired type of switch. It can be a button switch which is normally biased to an open position which is pressed to activate the solenoid 89. In this case, the button switch could be provided with a timer which will automatically open the switch contact after a predetermined period of time or the button could be required to be held in a pressed position for the duration of the flush operation. The switch could also be a toggle switch which is flipped in one direction to activate the solenoid 89 and then flipped in an opposite direction to deactivate the solenoid.

Often, an animal house H will include several watering lines, each with their own water regulator. As can be appreciated, to properly flush such a watering system, each regulator will need to be placed in a flush mode. The controller can be programmed to activate all the solenoids simultaneously or individually. Similarly, the override button OB can comprise a bank of buttons $OB_1$–$OB_4$, each of which will activate an individual solenoid or a determined group of solenoids to flush individual watering lines or a group of watering lines. Thus, for example, if medication or supplements are only delivered through one (or a subset) of the watering lines, the control system can flush only the watering lines through which medication or supplements were delivered, without the need to flush all the lines at the same time.

As various changes could be made in the above constructions without departing from the scope of the invention, it is intended that all matter contained in the above description or shown in the accompanying drawings shall be interpreted as illustrative and not in a limiting sense. Although the watering passage and flush passage of the inlet member are shown to be concentric, they could be side-by-side, to present a dual tube, rather than a concentric, or tube-within-a-tube, configuration. Although the flush port 123a is shown to be at the bottom of the water inlet member; the flush flow path could have a port in the side (rather than the bottom) of the inlet member. Such a side flush port would be positioned axially above the watering port 121a. Although a diaphragm is preferred for the flush valve 85, other types of valve members which can be automatically controlled could be used as well. For example, and without limitation, the diaphragm 85 could be replaced with a rotatable ball valve or butterfly valve element or an axially movable valve pin. Rather than providing a separate port 70 and flush path inlet port 77, a single opening or port could be formed in the tube 73 to place the chamber 75 in communication with the nozzle 67. In this instance, the flush valve (i.e., the diaphragm) would seal against an edge of the opening in the watering tube 73. The opening and closing of this opening would then move the inlet member between a watering or operating mode and a flush mode. These examples are merely illustrative.

The invention claimed is:

1. A pressure regulator for an animal drinking system, said drinking system comprising an elongate watering pipe having a plurality of drinking stations spaced therealong, said regulator comprising:
    a housing defining a chamber;
    a flexible diaphragm sealed with respect to said housing and dividing said chamber into a water chamber and an ambient chamber; said watering line being in fluid communication with said water chamber;
    a spring carried by said housing in operable engagement with said diaphragm such that the force of said spring and of the atmosphere acts upon said diaphragm to force said diaphragm toward said water chamber;
    a water inlet member adapted to be connected to a supply line; said inlet member defining a watering flow path and a flush flow path; said watering and flush flow paths both communicating with said housing water chamber; said watering flow path having a watering port and said flush flow path having a flush port; said flush port being spaced axially from said watering port;
    a regulator valve carried by said housing and being operatively associated with said diaphragm for movement between a closed position in which said valve blocks the flow of water from said inlet member watering port into said water chamber and an open position in which water is permitted to flow from said inlet member watering port into said water chamber such that with said spring adjusted to a predetermined level the force of said spring acting on the lower side of said diaphragm balances the force exerted on the water side of said diaphragm thereby to regulate the pressure of the water in said water chamber and within said watering pipe to a predetermined water pressure substantially less than the pressure of said water supply; and
    a flush valve in said water inlet member; said flush valve being selectively movable between a closed position in which water cannot flow through said flush flow path and a open position in which water can flow through said flush flow path into said water chamber to flush said water chamber and said watering pipe.

2. The pressure regulator of claim 1 wherein said inlet member is movable with respect to said housing between a regulating position in which said watering path port is engageable by said valve member so as to block the flow of water from said watering path port into said water chamber and a flushing position in which said watering path port is clear of said valve so as to permit water from said supply line to flow through said water chamber and into said watering pipe to flush said water chamber and said watering pipe.

3. The pressure regulator of claim 1 wherein said inlet member comprises a inlet adapted to be connected to a source of water; said watering flow path being in communication with said inlet; a flush inlet port in communication with said inlet; said flush valve including a valve member operable to be engaged with and disengaged from an end of said flush inlet port to move said flush valve between its said open and closed positions.

4. The pressure regulator of claim 1 wherein said flush valve member is a diaphragm.

5. The pressure regulator of claim 1 including a remotely controlled actuator to move said flush valve between its open and closed positions.

6. The pressure regulator of claim 5 wherein said actuator is a solenoid.

7. The pressure regulator of claim 1 wherein said actuator is remotely controlled by an electrical switch and/or a computer operated control system.

8. A pressure regulator for an animal drinking system, said regulator comprising:
    a housing defining a chamber; said housing including a flexible diaphragm sealed with respect to said housing and dividing said chamber into a water chamber and an ambient chamber; a spring carried by said housing in operable engagement with said diaphragm such that the force of said spring and of the atmosphere acts upon said diaphragm to force said diaphragm toward said water chamber; a water exit from said water chamber adapted to be connected to a drinking system watering line; and a water inlet received in said housing and member adapted to be connected to a supply line; said inlet member defining a watering flow path and a flush flow path; said watering and flush flow paths both communicating with said housing water chamber; said watering flow path having a watering port and said flush flow path having a flush port; said flush port being spaced axially from said watering port;

means from manually switching said regulator between a watering mode and a flush mode; and means for automatically switching said regulator between said watering mode and said flush mode.

9. The pressure regulator of claim 8 further comprising a regulator valve carried by said housing and being operatively associated with said diaphragm for movement between a closed position in which said valve blocks the flow of water from said inlet member watering port into said water chamber and an open position in which water is permitted to flow from said inlet member watering port into said water chamber such that with said spring adjusted to a predetermined level the force of said spring acting on the lower side of said diaphragm balances the force exerted on the water side of said diaphragm thereby to regulate the pressure of the water in said water chamber and within said watering pipe to a predetermined water pressure substantially less than the pressure of said water supply;

said inlet tube being movable axially relative to said regulator valve; whereby said inlet tube is moveable between a first position in which said regulator valve can open and close said inlet member watering port and a second position in which said inlet member cannot close said watering port; said manual flushing means comprising means for moving said inlet member between its said first and second positions.

10. The pressure regulator of claim 9 wherein said inlet member moving means comprises a lever operatively connected to said inlet member.

11. The pressure regulator of claim 8 wherein said automatic flushing means comprises a flush valve in said water inlet member; said flush valve being selectively movable between a closed position in which water cannot flow through said flush flow path and a open position in which water can flow through said flush flow path into said water chamber to flush said water chamber and said watering pipe.

12. An inlet member for a water pressure regulator; said inlet member being adapted to place said pressure regulator in communication with a source of water; said inlet member comprising:

a body having an inlet adapted to be connected to said source of water; a watering flow path in communication with said inlet and having a watering exit port; a flush flow path in communication with said source of water and having a flush exit port; said flush flow path being separate from said watering flow path; said flush exit port spaced axially from said watering exit port;

a flush valve in said flush flow path; said flush valve comprising a valve member and a valve seat; said valve member being selectively moveable between a closed position in which said valve member is seated against said seat to prevent water from exiting said flush exit port and an open position in which said valve member is disengage from said seat to allow water to pass through said flush flow path and exit said flush exit port.

13. The pressure regulator inlet member of claim 12 wherein said flush flow path at least partially surrounds said watering flow path.

14. The pressure regulator inlet member of claim 12 wherein said valve member is a diaphragm valve.

15. The pressure regulator inlet member of claim 12 including a flush valve chamber; a flush inlet port placing said flush flow path in communication with said flush valve chamber; said flush valve chamber also being in communication with said inlet; said flush inlet port defining said valve seat.

16. The pressure regulator inlet member of claim 12 comprises an actuator operable connected to said valve member to move said valve member between its open and closed positions.

17. The pressure regulator of claim 16 wherein said actuator is capable of being remotely activated.

* * * * *